US011926791B2

(12) United States Patent
Yeatts et al.

(10) Patent No.: US 11,926,791 B2
(45) Date of Patent: Mar. 12, 2024

(54) BIOCHAR PROCESS SYSTEM

(71) Applicant: High Plains Biochar LLC, Laramie, WY (US)

(72) Inventors: Cullen T. Yeatts, Laramie, WY (US); Matthew B. Henley, Mint Hill, NC (US)

(73) Assignee: High Plains Biochar LLC, Laramie, WY (US)

( * ) Notice: Subject to any disclaimer, the term of this patent is extended or adjusted under 35 U.S.C. 154(b) by 0 days.

(21) Appl. No.: 17/883,956

(22) Filed: Aug. 9, 2022

(65) Prior Publication Data
US 2023/0043524 A1 Feb. 9, 2023

Related U.S. Application Data

(60) Provisional application No. 63/230,925, filed on Aug. 9, 2021.

(51) Int. Cl.
*C10B 53/02* (2006.01)
*C10B 1/06* (2006.01)
(Continued)

(52) U.S. Cl.
CPC ............... *C10B 53/02* (2013.01); *C10B 1/06* (2013.01); *C10B 21/16* (2013.01); *C10B 47/44* (2013.01)

(58) Field of Classification Search
CPC .......................... C10B 53/02; C10B 47/30–48
See application file for complete search history.

(56) References Cited

U.S. PATENT DOCUMENTS 1,538,796 A * 5/1925 Gordon ................... C10B 57/02
202/113
2,224,823 A * 12/1940 Klein ........................ C10B 1/04
201/34
(Continued)

FOREIGN PATENT DOCUMENTS

| CN | 210314116 U | 4/2020 |
| CN | 111117674 A | 5/2020 |

(Continued)

OTHER PUBLICATIONS

International Search Report and Written Opinion issued for Int. Appl. No. PCT/US2022/039803, dated Jan. 24, 2023, 12 pp.

(Continued)

*Primary Examiner* — Jonathan Luke Pilcher
(74) *Attorney, Agent, or Firm* — James A. Sheridan; Sheridan Law, LLC

(57) ABSTRACT

There is disclosed a biochar processor for a continuous pyrolysis processing of organic material into biochar. In an embodiment, the biochar processor has a biochar processor interior space divided into a first combustion chamber and a second combustion chamber. A pyrolysis reactor passageway is disposed in the biochar processor interior space. The pyrolysis reactor tube has a conveyor drive to move the organic material from the first combustion chamber to the second combustion chamber. A vent tube is in communication with a plurality of vents in the first combustion chamber and the second combustion chamber. In an embodiment, a method of making a biochar processor is provided for the continuous pyrolysis of organic material into biochar. In an embodiment, a method of using a biochar processor is provided for continuously producing biochar from the biochar processor. Other embodiments are also disclosed.

11 Claims, 5 Drawing Sheets

(51) Int. Cl.
*C10B 21/16* (2006.01)
*C10B 47/44* (2006.01)

(56) References Cited

U.S. PATENT DOCUMENTS

| | | | | |
|---|---|---|---|---|
| 2,973,306 | A | * | 2/1961 | Chick ................... C10B 47/44 |
| | | | | 201/1 |
| 4,077,868 | A | * | 3/1978 | Chambers ............... C10G 1/02 |
| | | | | 585/242 |
| 10,899,042 | B2 | * | 1/2021 | Gehr ...................... B09C 1/065 |
| 11,731,879 | B2 | * | 8/2023 | Dunnigan ............. C10B 57/005 |
| | | | | 423/460 |
| 2012/0201913 | A1 | * | 8/2012 | Archer .................... C10L 5/44 |
| | | | | 106/6 |
| 2013/0256113 | A1 | * | 10/2013 | Tumiatti ................ C10B 49/14 |
| | | | | 422/187 |
| 2016/0039118 | A1 | * | 2/2016 | Gehr ..................... F23G 5/0273 |
| | | | | 423/447.2 |
| 2016/0146105 | A1 | | 5/2016 | Phan et al. |
| 2019/0039266 | A1 | * | 2/2019 | Gehr ........................ D01F 9/12 |
| 2020/0385273 | A1 | * | 12/2020 | Dunnigan ................ F27B 7/14 |
| 2020/0407642 | A1 | * | 12/2020 | Anderson .............. C10B 47/48 |
| 2021/0207033 | A1 | * | 7/2021 | Shah ...................... C10B 51/00 |

FOREIGN PATENT DOCUMENTS

CN 211600711 U 9/2020
EP 0025319 A1 * 3/1981 ............... C10B 7/10

OTHER PUBLICATIONS

English Translation of Claims from CN111117674A, 3 pp.
English Translation of Claims from CN210314116U, 2 pp.
English Translation of Claims from CN211600711U, 1 pp.

* cited by examiner

BIOCHAR PROCESS SYSTEM

REFERENCE TO PENDING PRIOR PATENT APPLICATION

This application claims the benefit under 35 U.S.C. 119(e) of U.S. Provisional Patent Application No. 63/230,925, filed Aug. 9, 2021 by Cullen T. Yeatts, et al. for "BIOCHAR PROCESS SYSTEM," which patent application is hereby incorporated herein by reference.

BACKGROUND

Biochar is a high-carbon, fine-grained residue that is produced via pyrolysis. Typically, biochar it is the direct thermal decomposition of biomass in the absence, or a limited amount, of oxygen (which prevents or reduces combustion), which produces a mixture of solids (e.g., the biochar proper), liquid (e.g., bio-oil), and gas (e.g., syngas products.)

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an embodiment, there is provided a biochar processor for a continuous pyrolysis processing of organic material into biochar, the biochar processor having: a biochar processor interior space divided into a first combustion chamber and a second combustion chamber; a pyrolysis reactor passageway disposed in the biochar processor interior space, the pyrolysis reactor tube having a conveyor drive to move the organic material from the first combustion chamber to the second combustion chamber; and a vent tube in communication with a plurality of vents in the first combustion chamber and the second combustion chamber.

In another embodiment, there is provided a method of making a biochar processor for the continuous pyrolysis of organic material into biochar, comprising: dividing a biochar processor interior space into a first combustion chamber fluidically connection to a second combustion chamber; disposing a pyrolysis reactor tube in the biochar processor interior space; disposing a pyrolysis tube auger inside of the pyrolysis reactor tube, the pyrolysis tube auger extending between a pyrolysis tube first end and a pyrolysis tube second end, the pyrolysis tube auger rotatable inside of the pyrolysis reactor tube; disposing a plurality of vents in spaced part relation between the pyrolysis tube first end and the pyrolysis tube second end; surrounding the plurality of vents with a vent tube, the vent tube defining a flow path to a first combustion chamber vent tube outlet disposed in the first combustion chamber and to a second combustion chamber vent tube outlet disposed in the second combustion chamber; and disposing a diverter inside of the vent tube, the diverter movable in the vent tube to associate the flow path from a first portion of the plurality vents to the first combustion chamber vent tube outlet and to associate the flow path from a second portion of the plurality vents to the second combustion chamber vent tube outlet.

In yet another embodiment, there is provided a method of using a biochar processor, comprising: delivering organic material to a pyrolysis reactor tube disposed in a biochar processor interior space divided into a first combustion chamber fluidically connected to a second combustion chamber; initially heating the organic material delivered to the pyrolysis reactor tube; generating synthesis gas or pyrolysis oils from the organic material which egress from the pyrolysis reactor tube through a plurality of vents disposed in spaced apart relation between a pyrolysis reactor tube first end and a pyrolysis reactor tube second end; flowing the synthesis gas or pyrolysis oils through a vent tube surrounding the plurality of vents to a first combustion chamber vent tube outlet in the first combustion chamber and to a second combustion chamber vent tube outlet in the second combustion chamber; combusting the synthesis gases or the volatile pyrolysis oils in the first combustion chamber and the second combustion chamber; moving the organic material in the pyrolysis reactor tube from the pyrolysis reactor tube first end toward the pyrolysis reactor tube second end; heating the organic material moving through the pyrolysis reactor tube with heat from combustion of the synthetic gases or the volatile pyrolysis oils in the first and second combustion chambers; and continuously producing biochar from the biochar processor.

Other embodiments are also disclosed.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which.

DETAILED DESCRIPTION

Figure 1:
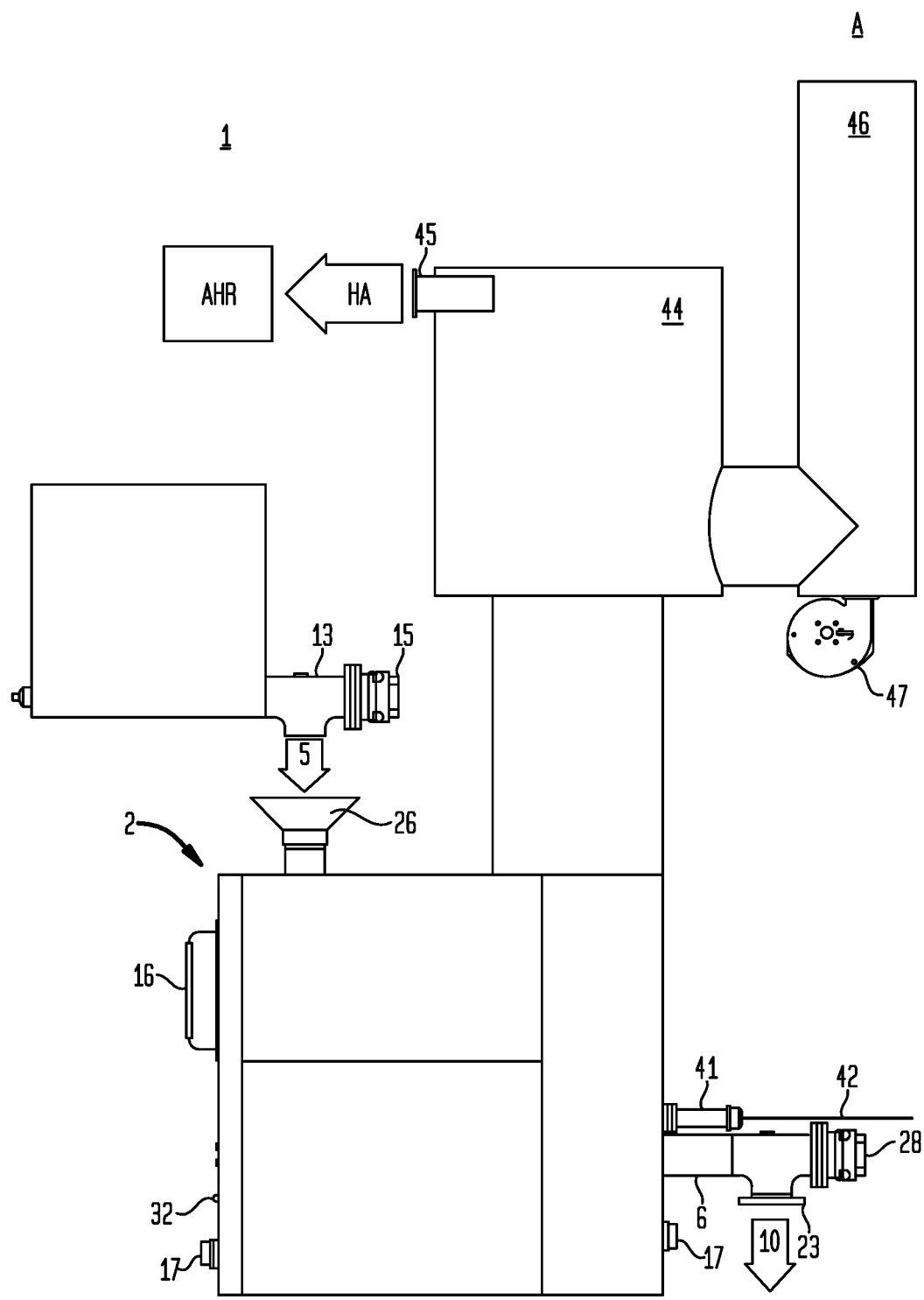
FIG. 1 is a front elevation view of an exemplary embodiment of a biochar processor.
Figure 2:
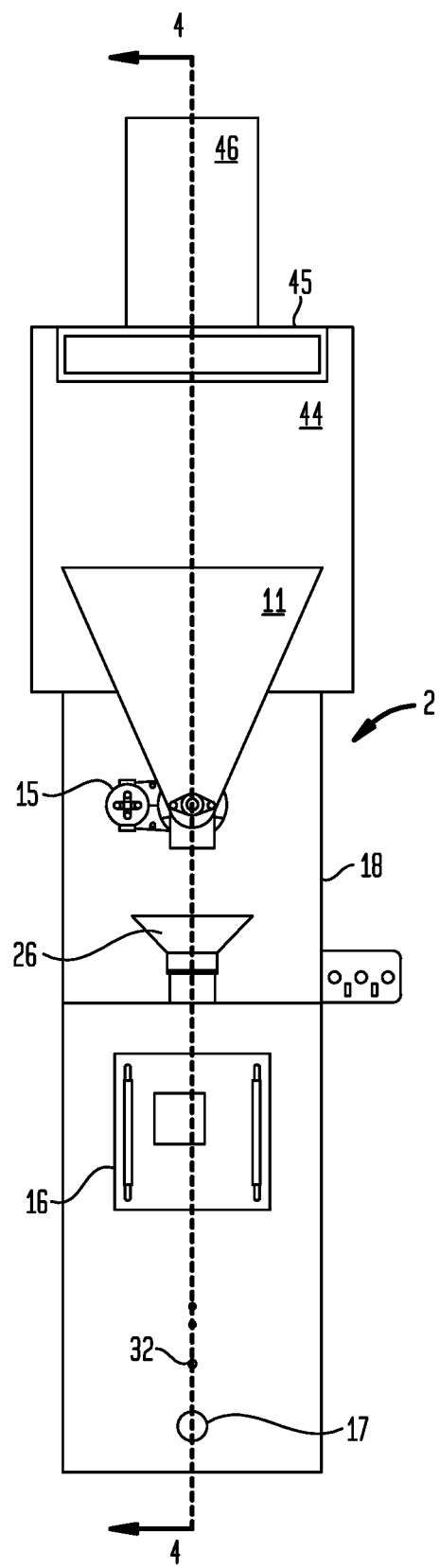
FIG. 2 is a first end elevation view of the biochar processor.
Figure 3:
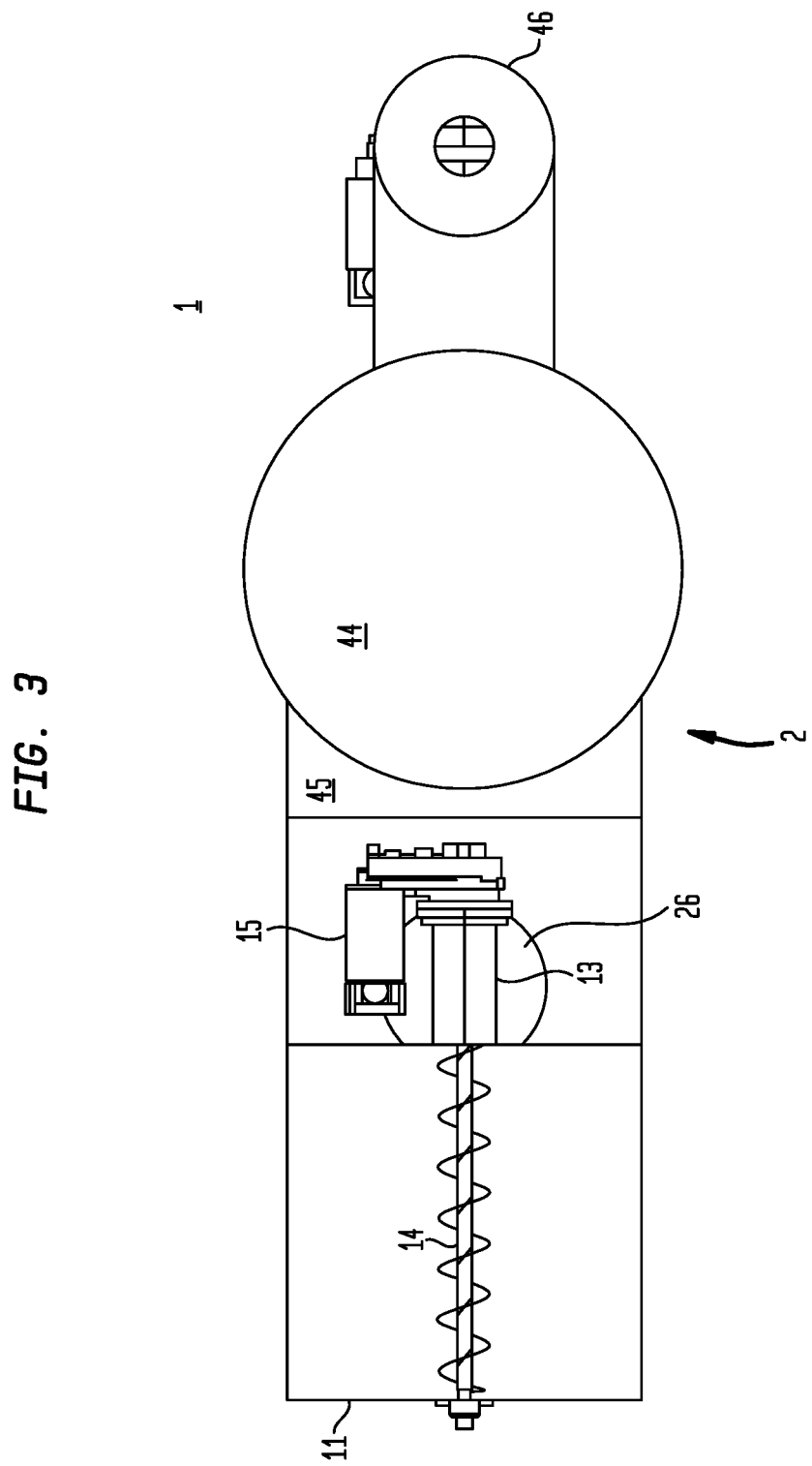
FIG. 3 is a top plan view of the biochar processor.

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

In at least one embodiment, there may be provided a biochar processor dimensionally configured and insulated to generate a continuous natural draft between fluidically connected first and second combustion chambers through a riser upwardly extending from the second combustion chamber during normal operation of the biochar processor without the use of a blower to move air through the biochar processor.

In at least one embodiment, there may be provided a biochar processor including an auger rotatable inside of a pyrolysis reactor tube disposed in a biochar processor to move organic material disposed at a pyrolysis reactor tube first end toward a pyrolysis reactor tube second end with pyrolysis synthesis gases and pyrolysis oils vented into the first and second combustion chambers which can be combusted to generate heat sufficient to drive the pyrolysis reaction for the continuous production of biochar.

In at least one embodiment, there may be provided a biochar processor having a pyrolysis reactor tube disposed in a biochar interior space divided into a first combustion chamber and a second combustion chamber wherein the pyrolysis reactor tube has a plurality of vents disposed in spaced apart relation between the pyrolysis reactor tube first end and the pyrolysis reactor tube second end which allow pyrolysis synthesis gases or volatile pyrolysis oils to flow into a vent tube having a first combustion chamber vent tube outlet disposed in the first combustion chamber and a second combustion chamber vent tube outlet disposed in the second combustion chamber, wherein the flow of synthesis gases and volatile pyrolysis oils to the first and second combustion chamber vent tubes can be balanced by movement of a gas flow diverter in the vent tube to associate the flow of synthesis gases and volatile pyrolysis oils from a first portion of the plurality vents to the first combustion chamber vent tube for combustion in the first combustion chamber and to associate the flow of synthesis gases and volatile pyrolysis oils from a second portion of the plurality vents to the second combustion chamber vent tube for combustion in the second combustion chamber, whereby combustion of a greater of lesser amount of synthesis gases or volatile pyrolysis oils in the first or second combustion chamber based on position of the diverter allows control of the temperature in the first and second combustion chambers.

Now with general reference to FIGS. 1 through 5, which depict a biochar process system 1 including a biochar processor 2 and a method of making the biochar processor 2 and a method of using the biochar processor 2 to release pyrolysis synthesis gases 3 or pyrolysis oils 4 from organic material(s) 5 moving in a pyrolysis reactor tube 6 disposed in a biochar processor interior space 7 having a first combustion chamber 8 or a second combustion chamber 9 in which the pyrolysis synthesis gases 3 or pyrolysis oils 4 from the organic material(s) can be combusted to provide heat (H) for the pyrolysis of the organic material(s) 5 moving in the pyrolysis reactor tube 6 for continuous production of a pyrolysis product biochar 10.

The term "biochar" for the purposes of various embodiments may include a by-product of the process of pyrolysis, or the anaerobic thermal decomposition, of organic material(s) 5. The pyrolysis of organic material(s) 5 releases synthetic gases 3 and pyrolysis oils 4 and yields the pyrolysis residue biochar 10.

The term "organic material" for the purposes of various embodiments may include any biomass that can undergo pyrolysis to yield biochar 10, and without limitation to the breadth of the foregoing, organic material(s) 5 can as illustrative examples comprise or consist of: wood; agricultural wastes such a straw, olive pits, nut shells, hemp stalks, corn, oat hulls miscanthus, or sorghum; forest wastes, such as: bark, wood pellets, wood chips, sawdust, timber slash, or mill scrap; leather wastes; sewage sludge, and combinations thereof.

The term "synthesis gas" for the purposes of various embodiments may include the gases released from organic material(s) during pyrolysis composed primarily of carbon monoxide, carbon dioxide, methane and hydrogen, and combinations thereof.

The term "pyrolysis oils" for the purposes of various embodiments may include liquid components released from pyrolyzed organic material(s) 5, which may vary based on the composition of the organic material(s) 5 pyrolyzed, including as illustrative examples: 1-hydroxy-2-propanone, acetic acid, furfural, 2-furanmethanol, 5-hydroxymethylfurfural, 3-methyl-1, 2-cyclopentanedione, phenol, 3-methylphenol, 4-methyl-phenol, 2-methoxy-phenol, 2-methoxy-4-methyl-phenol, 4-ethyl-phenol, eugenol, (E)-isoeugenol, vanillin, 1,2-benzenediol, 3-methyl-1, 2-benzenediol, 2, 3-dihydro-benzofuran, levoglucosan, and combinations thereof.

Depending on both the organic material(s) 5 and the temperature (T) at which the pyrolysis process is undertaken, pyrolysis of organic material(s) 5 leaves much of the carbon in the eventual biochar 10. As examples, at lower temperatures of between about 400° C. to about 500° C. (about 750° F. to about 950° F.) about one-half or more of the carbon from woody organic material(s) 5 can be preserved. At higher temperatures above 700° C. (about 1,300° F.) most of the organic material(s) 5 converts to synthesis gas with about 10% to about 20% of the resulting residue as biochar.

The resulting biochar 10 can be used as a soil amendment to, among other things, sequester stable carbon in soil, provide water and nutrient absorption capacity to soils, and even suppress soil-borne plant pathogens.

Now, with primary reference to FIGS. 1 through 4, embodiments of a biochar processor 2 can include an organic material hopper 11 defining a hopper interior space 12 in which organic material(s) 5 can be held from which organic material 1 can be fed to the biochar processor 2. The organic material(s) 5 can be comminuted to afford organic material particles having a size distribution which affords more consistent by products of the pyrolysis process. For example, in various embodiments, organic material(s) 5 can be comminuted and sieved with the fall through comprising the portion of the organic material(s) (5) introduced into the biochar processor 2. In various embodiments, the organic material(s) (5) that fall through can comprise particles of less than 2 inch (about 50.8 mm). The organic material hopper 11 can further include a hopper delivery tube 13 from which organic material(s) 5 can be fed to the biochar processor 2. In some embodiments, a delivery tube screw 14 can be disposed in the hopper delivery tube 13. The delivery tube screw 14 can be turned by a screw motor 15 to feed organic material(s) 5 at variably adjustable rate from the organic material hopper 11 to the biochar processor 2.

Again, with primary reference to FIGS. 1 through 4, the biochar processor 2 can define a biochar processor interior space 7 divided into a first combustion chamber 8 accessed by an access door 16 and an adjacent second combustion chamber 9. The first combustion chamber 8 and the second combustion chamber 9 can be insulated such that the temperature T inside the first and second combustion chamber 8, 9 during operation of the biochar processor 2 can be maintained sufficiently above the surrounding ambient air termperature AT to afford a continuous motion of air A from one or more air ports 17 located proximate the bottom of the first or the second combustion chambers 8, 9 through a riser 18 upwardly extending from the second combustion chamber 9. In various embodiments, the first combustion chamber 8, the second combustion chamber (9) and the riser 18 can be insulated with an insulation 19 that can withstand consistent temperatures exceeding about 1200° C. (about 2192° F.). As one example, the insulation 19 can comprise about 2 inches to about 6 inches of high-temperature insulation wool made from spun ceramic fiber.

Figure 4:
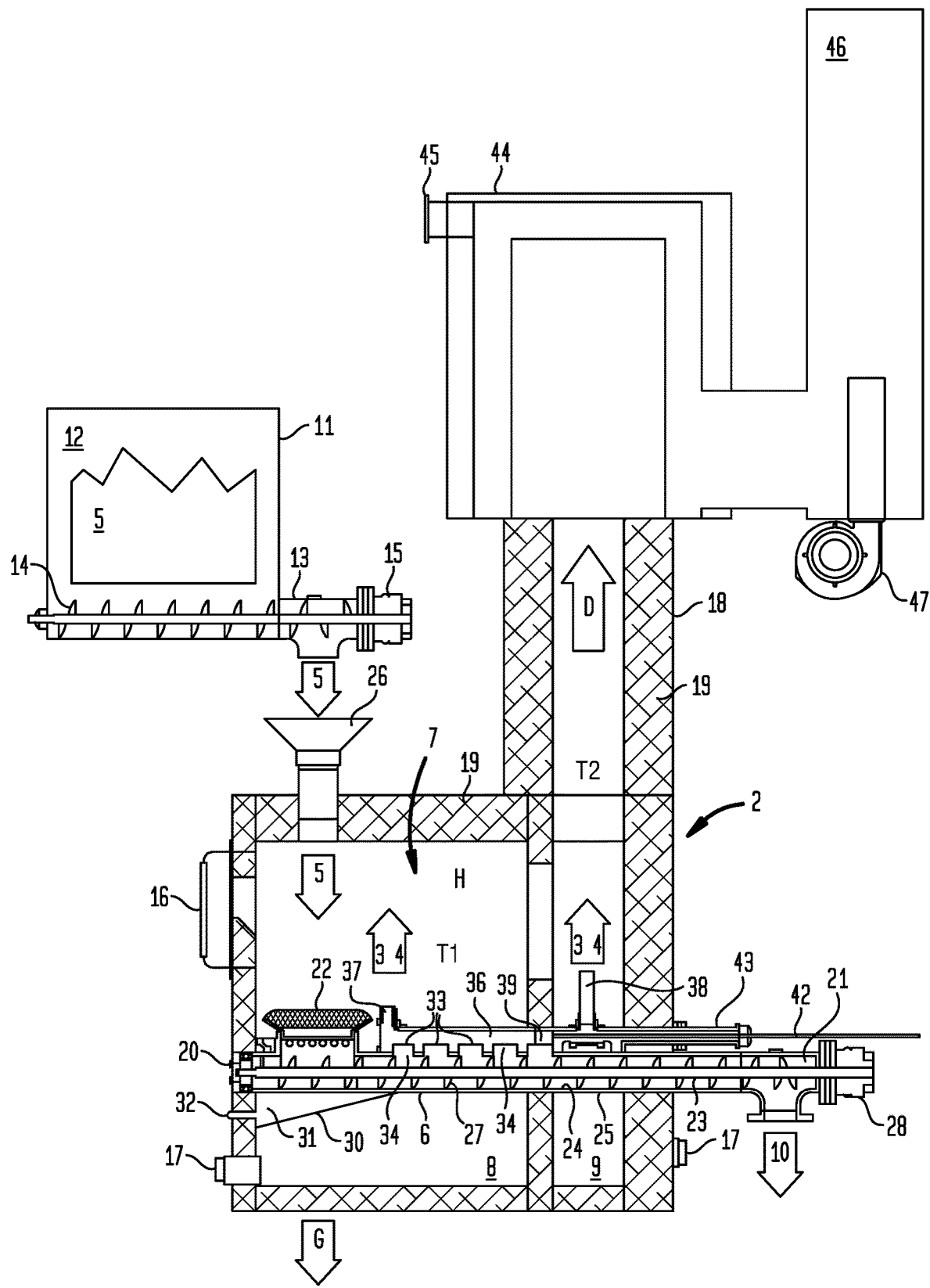
FIG. 4 is a cross section view 4-4 as depicted in FIG. 2.

Now, with primary reference to FIG. 4, a pyrolysis reactor tube 6 having a length disposed between a reactor tube first end 20 and a reactor tube second end 21 can be mounted inside the biochar processor 2 extending through the lower portion of the first combustion chamber 8 and the second combustion chamber 9. The pyrolysis reactor tube 6 can be a generally cylindrical tube comprised of a high temperature resistance material capable of withstanding pyrolysis temperatures of between about 300° C. (about 575° F.) to about 1300° C. (about 2400° F.). In exemplary embodiments, pyrolysis reactor tube 6 can comprise a metal or metal allow including one or more of iron, nickel, titanium, chromium, niobium, molybdenum, tantalum, tungsten.

Again, with primary reference to FIG. 4, the pyrolysis reactor tube 6 can include an organic material feed trough 22 disposed proximate the reactor tube first end 20 located in the first combustion chamber 8. The organic material feed trough 22 provides open access to a reactor tube interior space 23 defined by the pyrolysis reactor tube internal surface 24 in which organic material(s) 5 can be received from the organic material hopper 11 into the pyrolysis reactor tube 6. As depicted in FIG. 4, the organic material(s) 5 can fall under influence of gravity G from the organic material hopper 11 into a first combustion chamber feed 26, through the first combustion chamber 8 into the organic material feed trough 22. The advantage in the free fall of the organic material(s) 5 can be a lesser complexity in the first combustion chamber 8, and avoidance of occlusion of delivery conduits which can become plugged with organic material(s) 5 which upon exposure to heat T have a tendency to aggregate.

Again, with primary reference to FIG. 4, a pyrolysis tube auger 27 can be rotatably disposed in the pyrolysis reactor tube 6 and rotated to move the organic material(s) 5 from the reactor tube first end 2 toward the reactor tube second end 21. In various embodiments, the pyrolysis tube auger 27 can be connected to and turned by operation of auger motor 28 coupled to the reactor tube second end 21. The pyrolysis tube auger 27 can be turned at a variable adjusted speed to move the organic material(s) 5 through the pyrolysis reactor tube 6 at a greater or lesser rate depending on the temperature T of the first combustion chamber 8 and the temperature of the second combustion chamber 9, or the organic material(s) 5 can be moved from the pyrolysis reactor tube first end 20 toward the pyrolysis tube second end 21 at a consistent rate and the temperature in the first combustion chamber 8 T1 and the temperature in the second combustion chamber 9 T2 can be adjusted to achieve desired characteristics in the biochar 10 delivered from the pyrolysis tube second end 21.

Again, with primary reference to FIG. 4, in various embodiments, a punk tray 30 can be disposed under the pyrolysis tube first end 21. Punk 31 can be disposed in the punk tray 3. The punk 31 can be any combustible material of sufficient quantity or sufficiently high caloric value to initiate release of synthetic gases 3 or pyrolysis oils 4, or combinations thereof, from the organic material(s) 5 initially fed into the pyrolysis reactor tube 6 in the first combustion chamber 8. As illustrative examples, punk 31 suitable for use with various embodiments can be any combustible material having a caloric value equal to or greater than 3,500 kcal/kg, such as: wood pellets; wood including pine, hardwood or softwood; crop waste including peanut shell, corn stalk, corn cob; raw coal; crude oil; natural gas, although these examples are meant to be exhaustive of the punk 31 that can be utilized. Wood pellets can be convenient due to the small and uniform size with little ash or slag after combustion and in certain embodiments of the biochar processor 2 about one pound (about 500 grams) can be sufficient to initiate the continuous biochar process. However, the illustrative examples of punk 31 are not intended to preclude the use of other fuels to initiate the continuous biochar process, including as illustrative examples, gasoline, kerosene, diesel, liquified petroleum gas, or electrical heating elements.

Again, with primary reference to FIG. 4, embodiments can include a punk igniter 32 disposed in relation to the punk tray 3 to ignite the punk 31. As an example, a suitable punk igniter 32 for use with wood pellets can be pellet stove igniter such as 400 Watt 115 Volt igniter which converts electricity into heat which in contact with the punk 32 can ignite the punk 31. Alternatively, the punk 31 can be ignited manually through the use of a flammable material in burning contact with the punk 31.

Again with primary reference to FIG. 4, in various embodiments, the pyrolysis reactor tube 6 can include a plurality of vents 33 disposed in spaced apart relation along the length of the pyrolysis reactor tube 6. The plurality of vents 33 can provide a corresponding plurality of spaced apart vent passages 34 between the pyrolysis tube internal surface 24 and the pyrolysis tube external surface 26 through which synthesis gases 3 or volatized pyrolysis oils 4, or combination thereof, can pass during the biochar process. In at least some embodiments, a vent tube 35 can be disposed about the plurality of vents 33 or configured to capture the synthesis gases 3 or volatized pyrolysis oils 4 providing a vent tube flow path 36 to a first combustion chamber vent tube outlet 37 which allows egress of the synthesis gases 3 or volatized pyrolysis oils 4 into the first combustion chamber 8 or to a second combustion chamber vent tube outlet 38 which allow egress of the synthesis gases 3 or volatized pyrolysis oils 4 into the second combustion chamber 9, or to combination of the first and second combustion chamber vent tube outlets 37, 38 which allows egress of the synthesis gases 3 and the volatized pyrolysis oils 4 into the first combustion chamber 8 and the second combustion chamber 9.

Again, with primary reference to FIG. 4, in exemplary embodiments, the flow of synthesis gases 3 and the volatized pyrolysis oils 4 through the first combustion chamber vent tube outlet 37 can be balanced with the flow of synthesis gases 3 and the volatized pyrolysis oils 4 through the second combustion chamber vent tube outlet 38 by movement of a diverter 39 within the vent tube flow path (36) inside the vent tube 35. As an illustrative example, the diverter 39 can be positioned at a vent tube first end 40 proximate to the first combustion chamber vent tube outlet 37 with the vent tube flow path 36 from all of the plurality of vents 33 closed to the first combustion chamber vent tube outlet 37 and with the vent tube flow path 36 from the plurality of vents 33 open to the second combustion chamber vent tube outlet 38. Alternately, the diverter 39 can be positioned at a vent tube second end 41 proximate to the second combustion chamber vent tube outlet 38 with the vent tube flow path 36 from all of the plurality of vents 33 closed to the second combustion chamber vent tube outlet 38 and with the vent tube flow path 36 from all of the plurality of vents 33 open to the first combustion chamber vent tube outlet 37. The diverter 39 can be positioned medially between the first and second combustion chamber vent tube outlets 37, 38 with the vent tube flow path 36 from a portion of the plurality of vents 33 open to the first combustion chamber vent tube outlet 37 and the vent tube flow path 36 from a portion of the plurality of vents 33 open to the second combustion chamber vent tube outlet 38. By moving the diverter 39 to different positions medially between the first and second combustion chamber vent tube outlets 38, 29 the amount of synthesis gases 3 and the volatized pyrolysis oils 4 through the first combustion chamber vent tube outlet 38 can be balanced with the flow of synthesis gases 3 and the volatized pyrolysis oils 4 through the second combustion chamber vent tube outlet 38. In one embodiment, a diverter rod 42 can extend from the diverter 39 through a vent tube aperture 43 disposed in the vent tube first end 40 of the vent tube second end 41. Forcible urging on the diverter rod 42 can move the diverter 39 in the vent tube 35 to balance the flow of synthesis gases 3 and the volatized pyrolysis oils 4 through the first combustion chamber vent outlet 37 and through the second combustion chamber vent outlet 38.

Again, with primary reference to FIGS. 1 through 4, embodiment can include a heat exchanger 44 which receives the draft D passing through the riser 18 upwardly extending from the secondary combustion chamber 9. The heat H in the draft D flowing through the riser 18 can be captured by the heat exchanger 44. The draft D can pass about the heat exchanger 44 and the heated air HA can be discharged through a heat exchanger discharge port 45. The HA can be utilized as a heat source for ancillary heat requirements AHR, such as: drying the organic material(s) 5 prior to introduction into the organic material hopper 11 for processing, or heating the interior space in building, heating water, generating electricity.

Again, with primary reference to FIGS. 1 through 4, embodiments can include a chimney 46 including a generally vertical channel or pipe fluidically coupled to the second combustion chamber 9, whether direction or indirectly, and as shown in the illustrative examples to the riser 18, or through a combination of the heat exchanger 44 and the riser 18. In various embodiments, a blower 47 can be coupled to the chimney 46 to generate an air flow AF in the chimney 46 to initiate or maintain a draft D from the first combustion chamber 8 and the second combustion chamber 9 through the chimney 46 to atmosphere A.

Figure 5:
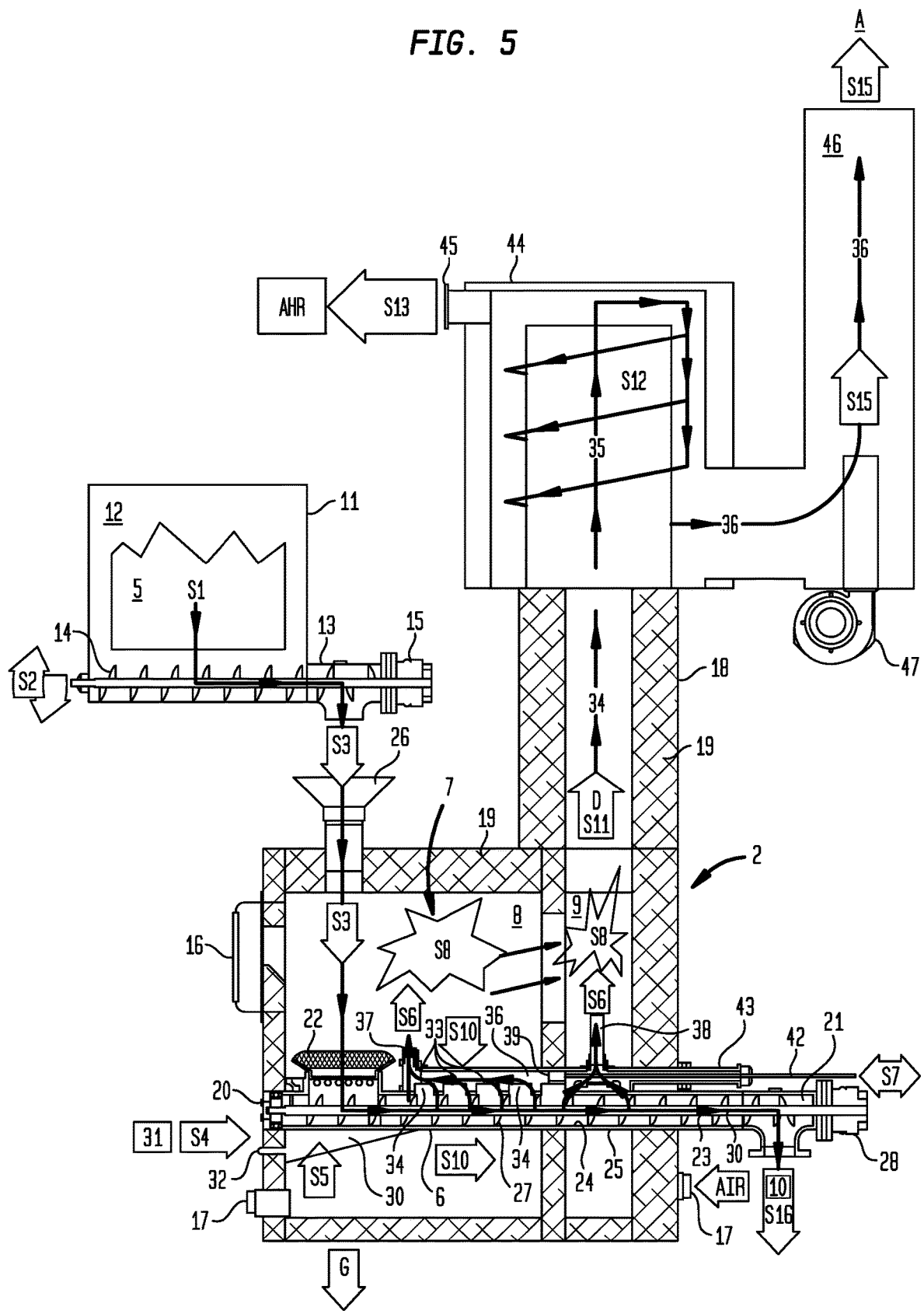
FIG. 5 is a cross section view as depicted in FIG. 4 illustrating a method of processing organic material into biochar using an embodiment of the biochar processing.

Now, with primary reference to FIG. 5 depicting a method of using a biochar processor 2 and a method making biochar 10 includes one or more: disposing organic material(s) 5 in an organic material hopper 51, rotating a delivery tube screw 14 disposed in a hopper delivery tube 13 S2, delivering organic material under influence of gravity G through the first combustion chamber 8 into an organic material feed trough 22 coupled to the reactor tube first end 20 S3, disposing punk 31 into a punk track 30 located underneath the reactor tube first end 20 S4, ignited the punk 31 in the punk tray 30 to initially heat the organic material(s) 5 delivered to the pyrolysis reactor tube 6 through the organ material fee trough 22 S5, generated synthesis gases 3 or pyrolysis oils 4 from heated organic materials 5 which egress from the pyrolysis reactor tube 6 through a plurality of vents 33 disposed in the pyrolysis reactor tube 6 into a vent tube 35 S6, moving a diverter 39 in the vent tube 35 to balance the flow of synthesis gases 3 and volatile pyrolysis oils 4 between egress through a first combustion chamber vent tube outlet 38 or second combustion chamber vent tube outlet 39 into corresponding first and second combustion chambers 8, 9 or in combinations thereof S7, combusting the synthesis gases 3 or volatile pyrolysis oils 4 in the first and second combustion chambers 8, 9 S8, moving the organic material(s) 5 in the pyrolysis reactor tube (6) from the reactor tube first end 20 toward the reactor tube second end 21 S9; heating organic material(s) 5 moving through the pyrolysis reactor tube 6 with the heat H from the combustion of the synthetic gases 3 or volatile pyrolysis oils 4 in the first and second combustion chambers 8, 9 S10; generating a draft D from the first and second combustion chambers 8, 9 through a riser 18 upwardly extending from the second combustion chamber 9 S11; capturing heat H from the draft D passing through the riser 18 with a heat exchanger 44 S12; delivering captured heat H from the heat exchanger 44 to ancillary heat requirements AHR S13; passing the combustion products from the first and second combustion chambers 8, 9 to atmosphere A through a chimney 46 S14; and optionally initiating draft from the first and second combustion chambers 8, 9 by operation of a blower 47 in the chimney 46 S15; continuously producing biochar 10 from the biochar processor 2 S16.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A method of using a biochar processor, comprising:
delivering organic material to a pyrolysis reactor tube disposed in a biochar processor interior space divided into a first combustion chamber fluidically connected to a second combustion chamber;
initially heating the organic material delivered to the pyrolysis reactor tube;
generating a flow of synthesis gas or pyrolysis oils from the organic material, the flow egresses from the pyrolysis reactor tube through a plurality of vents disposed in spaced apart relation between a pyrolysis reactor tube first end and a pyrolysis reactor tube second end;
directing the flow of synthesis gas or pyrolysis oils through a vent tube surrounding the plurality of vents directly to a first combustion chamber vent tube outlet in the first combustion chamber and directly to a second combustion chamber vent tube outlet in the second combustion chamber;
combusting synthesis gases or volatile pyrolysis oil received directly from the flow of synthesis gas or pyrolysis oils in the first combustion chamber and the second combustion chamber;
moving the organic material in the pyrolysis reactor tube from the pyrolysis reactor tube first end toward the pyrolysis reactor tube second end;
heating the organic material moving through the pyrolysis reactor tube with heat from combustion of the synthetic gases or the volatile pyrolysis oils in the first and second combustion chambers; and
continuously producing biochar from the biochar processor.

2. The method of claim 1, wherein the step of heating the organic material includes heating to a temperature from about 300° C. to about 1300° C.

3. The method of claim 1, wherein the step of heating the organic material includes heating to a temperature from about 400° C. to about 500° C.

4. The method of claim 1, wherein the step of heating the organic material includes heating to a temperature above 1200° C.

5. The method of claim 1, further comprising:
moving a diverter in the vent tube to balance the flow of the synthesis gases or the volatile pyrolysis oils between egress through the first combustion chamber vent tube outlet or the second combustion chamber vent tube outlet.

6. The method of claim 1, further comprising generating a draft from the first combustion chamber and second combustion chamber through a riser upwardly extending from the second combustion chamber without using a blower to move air through the biochar processor.

7. The method of claim 6, further comprising:
capturing heat from the draft passing through the riser with a heat exchanger;
delivering captured heat from the heat exchanger to ancillary heat requirements; and
passing the combustion products from the first combustion chamber and second combustion chamber to atmosphere.

8. The method of claim 6, further comprising burying the biochar produced by the biochar processor in a soil area so as to sequester stable carbon of the biochar in the soil area.

9. The method of claim 1, further comprising generating a draft through a riser upwardly extending from the second combustion chamber without using a blower to move air through the biochar processor.

10. The method of claim 1, wherein all of the steps recited in claim 1, and the method as a whole, are operable without using a blower to move air through the biochar processor in any of the steps recited in claim 1.

11. The method of claim 1, wherein all of the steps recited in claim 1, and the method as a whole, are operable without the use of an electric powered blower to move air through the biochar processor.

* * * * *